Figure 1:
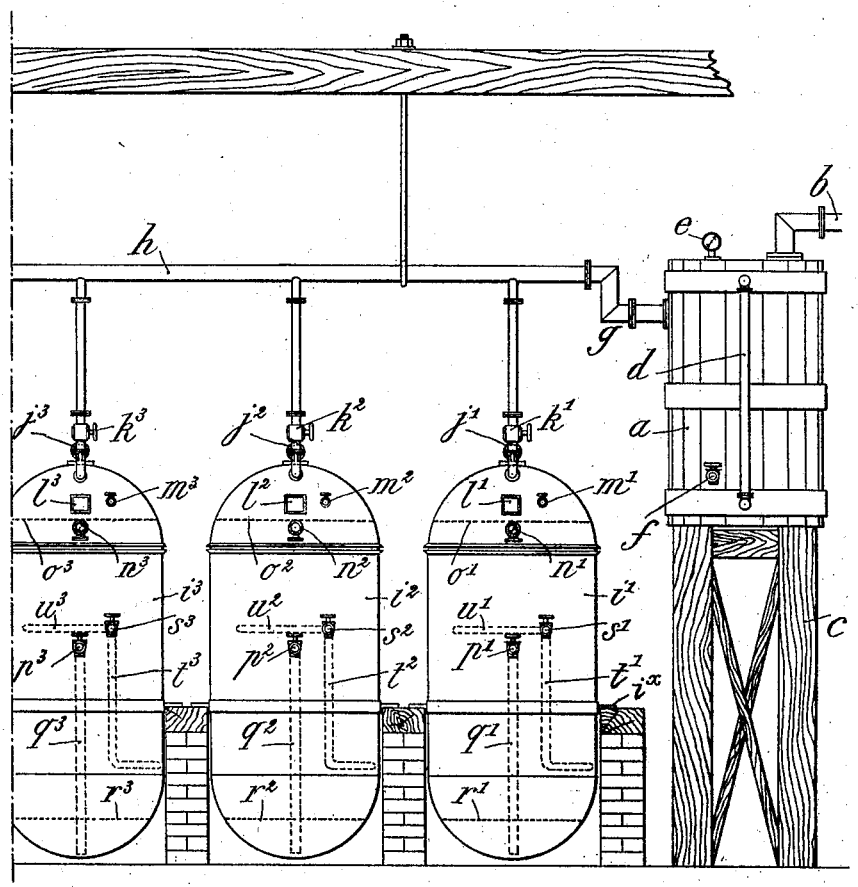

No. 823,508. PATENTED JUNE 19, 1906.
L. CASTETS.
APPARATUS FOR THE EXTRACTION OF TANNIN.
APPLICATION FILED SEPT. 12, 1904.

No. 823,508. PATENTED JUNE 19, 1906.
L. CASTETS.
APPARATUS FOR THE EXTRACTION OF TANNIN.
APPLICATION FILED SEPT. 12, 1904.
2 SHEETS—SHEET 2.
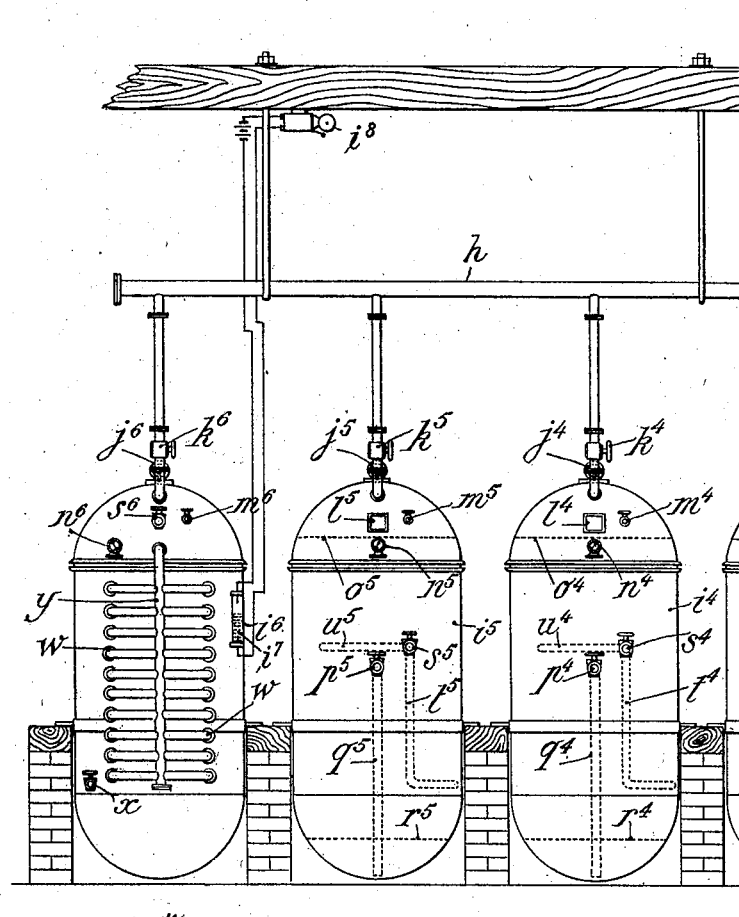
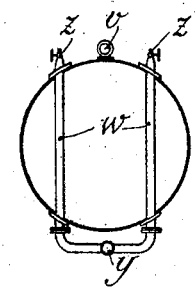
Witnesses.
Harry L. Ames,
A. V. Dommers
Inventor.
Louis Castets.
by Henry Orth Jr.
attys.

UNITED STATES PATENT OFFICE.

LOUIS CASTETS, OF DAX, FRANCE.

APPARATUS FOR THE EXTRACTION OF TANNIN.

No. 823,508.  Specification of Letters Patent.  Patented June 19, 1906.

Application filed September 12, 1904. Serial No. 224,163.

*To all whom it may concern:*

Be it known that I, LOUIS CASTETS, manufacturer, a citizen of the Republic of France, and a resident of 53 Rue Vincent de Paul, Dax, Landes, France, have invented certain new and useful Improvements in Apparatus for the Extraction of Tannin at a Low Temperature and at a Low Pressure; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to apparatus for use in the extraction of tannin at a low temperature and at a low pressure, such apparatus permitting the tanner to prepare the liquors himself, thus affording the advantage of always being able to employ them in a fresh condition.

The materials to be treated are placed in receptacles in which a vacuum is created and where they are submitted to a continuous treatment in cold water in such a way that the water is brought into contact with more and more-highly charged materials as the water itself becomes increasingly charged with tannin.

The vacuum maintained in the apparatus has the effect of opening the pores of the materials under treatment, and consequently of facilitating the withdrawal of the tannin. It has the further advantage of maintaining a comparatively low temperature in the apparatus, so as to prevent the carrying along of coloring and resinous matters, which are very detrimental in the production of leather. Moreover, the exclusion of air tends to prevent the oxidation which occurs when a liquid is brought into contact with vegetable substances, and consequently to sensibly diminish the coloring agents. Finally, the vacuum maintained in the apparatus permits of the introduction of the liquid into the receptacles and its transfer from one receptacle to the next by the difference of pressure, as will be hereinafter explained.

The liquors obtained are subsequently conveyed to a special receptacle, where they are submitted to clarification, which frees them from foreign matters and coloring agents or other impurities carried along by them.

Figure 1 of the accompanying drawings is a side elevation of a portion of a suitable form of apparatus for the extraction of tannin according to the present invention. Fig. 2 is a side elevation of the other portion of the apparatus shown in Fig. 1, the two figures showing a complete apparatus. Fig. 3 is a horizontal section of the special receptacle in which the liquors are clarified.

An air-pump (not represented in the drawings) is employed which is capable of maintaining a vacuum of about seventy-five centimeters of mercury throughout the apparatus. This pump, through a tube $b$, of copper or other suitable material, is in communication with a wooden receptacle $a$. This wooden receptacle, mounted on any suitable support $c$, is preferably of cylindrical form in order to offer more efficient resistance to the external atmospheric pressure. It is provided with a level-gage $d$, a vacuum-gage $e$, and a discharge-valve $f$. It is connected by a tube $g$, of copper or other suitable material, with a collecting-pipe $h$ of the same material. Such collecting-pipe $h$ is provided with a certain number of branch pipes—six, for example—which place same in communication with the same number of receptacles in which the extraction and clarification are effected. These six receptacles should also be of a material which is unaffected by the liquors, preferably of copper. They are mounted on trunnions which permit of them being turned over.

The five first receptacles $i'$ $i^2$ $i^3$ $i^4$ $i^5$ are identical and furnished with the same fittings. They are of cylindrical form, closed at each end by hemispherical heads or caps. The lower head is riveted to the cylindrical body. The upper head forms a cover and makes a tight joint with the cylinder. The receptacle $i'$ at the top of its head-cover carries an iron ring $j'$ for the purpose of manipulation. The cover is also provided with a cock $k'$, to which is connected a flexible metallic tube (preferably of copper) placing same in communication with the collecting-pipe. The cover is also provided with a glass observation-opening $l'$, to which a corresponding glass observation-opening is diametrically opposed. Beside the first observation-opening $l'$ a small cock $m'$, serving for the introduction of air into the apparatus, is situated. Finally upon the cover the vacuum-gage $n'$ is mounted. Within the cover and a little below the observation-openings is fixed a plate $o'$, of copper or other suitable material, and which is perforated and forms a sieve. Toward the middle of the cylindrical body the receptacle $i'$ is provided with a cock $p'$, to which is fitted a tube $q'$, following the inner wall of the receptacle and descending to the bottom of the lower hemispherical head. A little above the bottom of this head a plate $r'$, of copper or other unattackable material, is fixed. Beside the cock $p'$, and preferably a little above same, a second cock $s'$ of the same size is arranged, fitted with two tubes $t'$ and $u'$, the total sectional area of which equals that of the cock $s'$. The tube $t'$ descends along the wall of the cylinder as far as the beginning of the hemispherical portion, where it is bent horizontally in the direction from left to right, describing a quarter-circle. The tube $u'$ has simply the form of a quarter of a circle, which follows the inside of the cylindrical wall at the height of the cock $s'$ and in the direction from right to left in such a way that the two tubes are situated diametrically opposite, but at different levels.

The four receptacles $i^2$ $i^3$ $i^4$ $i^5$ are identical to the receptacle $i'$. They are provided with the same accessories, which are indicated by the same letters on the drawings as the receptacle $i'$; but the letters for each receptacle bear the same numeral as the receptacle itself.

The sixth receptacle $i^6$ presents the same exterior form as the five others. On the summit of the cover is fixed an iron ring $j^6$, which permits of its manipulation. This cover also carries a third cock $k^6$, which places the sixth receptacle in communication with the collecting-pipe, a small cock $m^6$ for the admission of air, a vacuum-gage $n^6$, and finally a cock $s^6$ of the same size as the cock $s$ of the other receptacles. The cylindrical part is fitted with a liquid-level gage running the whole of its length, (indicated at $v$ in Fig. 2.) This sixth receptacle is provided inside with a cooling or refrigerating apparatus and may advantageously be fitted with an electric thermometer $i^7$, having a movable contact connected outside with an electric bell $i^8$. At the bottom of the cylindrical part is a discharge-cock $x$.

The operation of the apparatus is now easy to understand. Each of the five receptacles $i'$ $i^2$ $i^3$ $i^4$ $i^5$ receives a number of order of rotation, commencing, for example, with $i'$, which bears "No. 1," $i^2$ will bear "No. 2," and so on up to "No. 5." After having introduced into each of the first five receptacles a suitable quantity of material to be treated a vacuum is created throughout the apparatus by opening all the cocks $k$ and actuating the suction-pump. Then water is introduced into the receptacle No. 1 through the cock $s'$ up to the level of the glass observation-openings $l'$. When this water has remained a longer or shorter time in the receptacle $i'$, the cock $k'$ is closed, the cocks $p'$ of No. 1 and $s^2$ of No. 2 are connected by a flexible tube, (not shown,) and the cocks $m'$ $p'$ $s^2$ are opened. A certain quantity of air enters receptacle No. 1 through its cock $m'$, drives the liquid which it contains into No. 2, where it enters through the cock $s^2$ and by the tubes $t^2$ $u^2$. The special arrangement of these tubes inside the receptacle causes agitation and a whirling action of the liquid upon the active materials, which favors the extraction of the tannin. This transfusion completed, the cocks $m'$ $p'$ $s^2$ are closed, the communication is cut off, and the cock $k'$ of No. 1 is again opened to reëstablish the vacuum. Then the latter receptacle is refilled by introducing water through the cock $s'$ up to the level of the observation-opening $l'$. As the liquid transfused from No. 1 to No. 2 does not attain the level of the glass observation-openings, (on account of the liquid which the materials of No. 1 have imbibed,) a fresh quantity of liquid is transfused from No. 1 to No. 2 in the same manner as previously, after which No. 1 is again filled.

The operations above described are repeated for the transfusion from No. 2 to No. 3, from No. 3 to No. 4, and from No. 4 to No. 5, always bringing the level of the liquid up to the glass observation-openings, with the exception of the receptacle No. 5, for which the level need not be considered. The series of five receptacles will thus be brought into operation. When it has remained in contact with the tannin materials for a sufficient period, the liquid from No. 5 is transfused through the cock $s^6$ into receptacle $i^6$, where it is submitted to the clarification operation to be hereinafter described. The liquid from No. 5 having been evacuated, that of No. 4 is transfused to No. 5, No. 3 to No. 4, No. 2 to No. 3, and No. 1 to No. 2. As at this time the materials of No. 1 are exhausted, (the number of receptacles being calculated for this purpose,) this receptacle is isolated by closing cock $k'$. Air is allowed to enter through cock $m$, and the cover is removed by means of a tackle (not shown) connected to the ring $j$. The receptacle is caused to pivot upon its two trunnions $i^x$, and the exhausted materials are turned out and replaced by an equal quantity of fresh materials. The receptacle is then turned back into position and the cover replaced. The cock $k'$ is reopened, so as to reëstablish a vacuum in the receptacle $i'$, which from then takes the number of rotation 5, while $i^2$ becomes No. 1, $i^3$ No. 2, $i^4$ No. 3, and $i^5$ No. 4. The liquid is then caused to pass from $i^5$ into $i'$, where it comes into contact with the fresh material. The liquid is transfused from $i^4$ into $i^5$, from $i^3$ into $i^4$, from $i^2$ into $i^3$. Finally water is introduced into $i^2$ to the desired level. When the liquid of No. 1 has remained a sufficient time in contact with the tannin materials, it is transfused into No. 6, and the series of operation is restarted, taking off the order of rotation by one figure.

During the progress of the operations it is advantageous to leave the valves $m'$ slightly open either during the whole time or for a part of the time only, so as to allow a fine stream of air to penetrate to the interior of the receptacles, which dilates and lowers the temperature. This air is drawn off as it is supplied by the air-pump, which is calculated so as to maintain a vacuum in the apparatus of about seventy-five centimeters of mercury, for the effect of the vacuum does not become efficacious if such vacuum is not carried sufficiently far, and the results are all the more rapid and the juices or liquors all the more concentrated as the vacuum created is higher.

The vegetable materials in the copper receptacles $i'$ $i^2$ $i^3$ $i^4$ $i^5$, under the action of the vacuum in swelling, have a tendency to float. It is in order to prevent this inconvenience that the perforated plates $o$ are placed in the covers to retain the whole mass firmly in the liquid. The perforated plates $r$ at the lower part of the receptacles prevent the solid materials from passing from one receptacle to another and obstructing the tubes.

The action of the vacuum has the effect of inducing the formation of a plentiful froth or foam which floats above the liquid. This foam is carried off into the collecting-pipe $h$ and thence flows into the wooden vessel $a$, where it collects and becomes converted into liquid. This liquid, which contains a certain proportion of tannin, may be advantageously employed in place of water for filling the copper receptacles. So as to accelerate the exhaustion of the materials it is as well to open the cocks $m$ from time to time to introduce a fine stream of air into the receptacles, which energetically agitates the liquid, producing whirling motions in all directions and which by its dilatation further lowers the temperature.

During the progress of the preceding operations certain foreign bodies—such as resins, coloring-matter, or other impurities—may have been carried away in the juices or liquors at the same time as the tannin. It is therefore necessary to cause these juices or liquors to undergo an operation of clarification, and it is for this purpose that the sixth receptacle $i^6$ is provided, to which are conveyed the juices or liquors which have passed through the five first receptacles. In this sixth receptacle the juices or liquors are treated at a low temperature and $in$ $vacuo$, cold as well as a vacuum having the property of precipitating heavy bodies. For this purpose the sixth receptacle communicates by a cock $k^6$ and a flexible metallic tube with the collector $h$—that is to say, with the air-pump which produces the vacuum therein. It is further provided with a refrigerating or cooling apparatus. This refrigerator may, for example, be on the air-expansion system and be composed, as shown in the annexed drawings, of a set or cluster of tubes $w$, of copper or other unattackable material, presenting a suitable cooling-surface. Each of the tubes of this cluster communicates at one end with a common vertical tube $y$, which at its upper extremity terminates at the cover of the receptacle $i^6$ and opens out in the interior thereof, thus communicating with the air-pump. At its other extremity each tube of the set or cluster carries a small cock $z$, which is opened to a smaller or greater extent. Air enters by these cocks $z$ into the tubular set or cluster, in which the pump maintains a vacuum, and it dilates, producing a more or less intense cold, which is regulated by the opening of the cocks. The foreign bodies are precipitated in the lower hemispherical portion of the receptacle, and the clarified juices or liquors are run off through the discharge-cock $x$, placed at the bottom of the cylindrical part.

It will be very evident that the apparatus above described may be subjected to certain modifications, either as to the arrangement or the number of its elements or as to the details of construction without in any way departing from the principle of the invention.

What I claim as my invention, and desire to secure by Letters Patent, is—

1. An apparatus for the extraction of tannin under the action of cold and $in$ $vacuo$, comprising a series of receptacles each provided with a removable cover; two trunnions; two cocks enabling them to be placed in communication with the other receptacles; a descending tube fitted to one of these cocks; two tubes bent horizontally in opposite directions and fitted to the other of the cocks; an air-admission cock, and with a branch tube from a common conduit adapted to be connected with an air-pump; a clarifying-receptacle in communication with the above-named vacuum-conduit, and capable of connection with the last extraction vessel, and provided with an air-admission cock and a means of refrigerating or cooling.

2. An apparatus for the extraction of tannin under the action of cold and $in$ $vacuo$, comprising a series of receptacles each provided with a removable cover; two trunnions; two cocks enabling them to be placed in communication with the other receptacles; a descending tube fitted to one of these cocks; two tubes bent horizontally in opposite directions and fitted to the other of the cocks; an air-admission cock, and with a branch tube from a common conduit adapted to be connected with an air-pump; a clarifying-receptacle in communication with the above-named vacuum-conduit, and capable of connection with the last extraction vessel, and provided with an air-admission cock and means of refrigerating or cooling; a receptacle situated in the course of said vacuum-conduit and serving to receive the froths or foams containing tannin.

3. An apparatus for the extraction of tannin under the action of cold and *in vacuo*, comprising a series of receptacles each provided with a removable cover; two trunnions; upper and lower perforated false bottoms, two cocks enabling each receptacle to be placed in communication with the others; a descending tube fitted to one of said cocks; two tubes bent horizontally in opposite directions and fitted to the other of the cocks; an air-admission cock, and with a branch tube from a common conduit adapted to be connected with an air-pump; a clarifying-receptacle in communication with the above-named vacuum-conduit, and capable of connection with the last extraction vessel, and provided with an air-admission cock and a means of refrigerating or cooling.

4. An apparatus for the extraction of tannin under the action of cold and *in vacuo*, comprising a series of receptacles each provided with a removable cover; two trunnions; two cocks enabling them to be placed in communication with the other receptacles; a descending tube fitted to one of these cocks; two tubes bent horizontally in opposite directions and fitted to the other of the cocks; an air-admission cock, and with a branch tube from a common conduit adapted to be connected with an air-pump; a clarifying-receptacle in communication with the above-named vacuum-conduit, and capable of connection with the last extraction vessel and provided with an air-admission cock and a set or cluster of tubes subjected to the action of a vacuum and in which adjustable cocks permit of the entrance of atmospheric air which dilates therein.

5. An apparatus for the extraction of tannin comprising a series of receptacles adapted to hold a quantity of material to be treated, a vacuum-conduit communicating with said receptacles, means for introducing a quantity of liquid into one of said receptacles, means for transferring said liquid from said receptacle directly into another receptacle, means for agitating the material in the receptacle, means for cooling the liquid after agitation, and a receptacle for receiving the cooled liquid.

6. An apparatus for the extraction of tannin comprising a series of receptacles adapted to hold a quantity of material to be treated, a vacuum-conduit, means connecting each receptacle with said conduit, cocks for establishing communication between the receptacles, a tube descending from one cock, pipes branching from the other cock, a clarifying apparatus in communication with the vacuum-conduit, and a refrigerating-receptacle adapted to communicate with the aforesaid receptacles and the vacuum-conduit.

In testimony that I claim the foregoing as my invention I have signed my name in presence of two subscribing witnesses.

LOUIS CASTETS.

Witnesses:
ALEXANDER BEIUROTH,
ALCIDE FABE.